(No Model.)

W. A. MURRAY.
HOE AND CULTIVATOR.

No. 352,881. Patented Nov. 16, 1886.

Witnesses.
Robert Everett
Manierre Ellison

Inventor:
William A. Murray
By J. L. Stetson
Attorney

N. PETERS, Photo-Lithographer, Washington, D. C.

UNITED STATES PATENT OFFICE.

WILLIAM ARCHD. MURRAY, OF PIAKO, AUCKLAND, NEW ZEALAND.

HOE AND CULTIVATOR.

SPECIFICATION forming part of Letters Patent No. 352,881, dated November 16, 1886.

Application filed October 13, 1885. Serial No. 179,755. (No model.) Patented in New Zealand January 8, 1885, No. 1,353.

*To all whom it may concern:*

Be it known that I, WILLIAM ARCHD. MURRAY, a subject of the Queen of England, and a resident of Piako, Auckland, New Zealand, have invented a certain new and useful Improvement in Hoes and Cultivators, of which the following is a specification.

I employ adjustable revolving disks of concavo-convex form, which may be arranged at will either to cut close to the row of plants, to destroy weeds and loosen up the soil close to the roots, or to "hill up" the rows by throwing the dirt against the plants.

I employ guiding-disks at the front of the cultivator, manipulated by a convenient hand-lever, which extends back to the driver's seat, to direct the line of travel, allowing the operator to guide the working parts of the cultivator very close to the plants without injuring them.

I employ shovel-plows to loosen up the soil between the rows and to throw the soil against the rows upon either side.

In use the guiding-disks and operating-disk serve as riding-wheels, the plows upon either side serving to maintain the cultivator in proper position.

Figure 1:
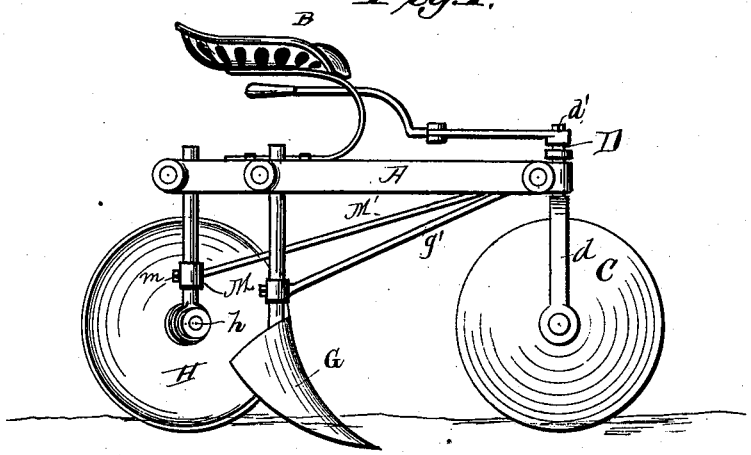
Figure 2:
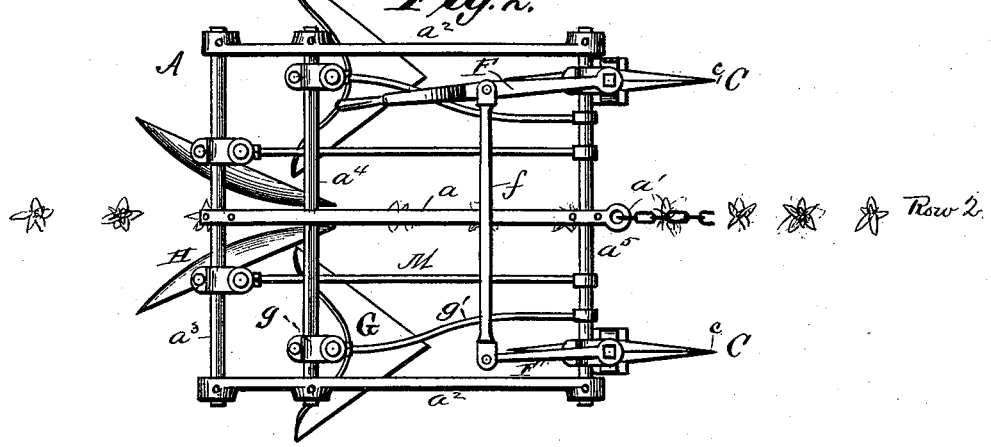
Figures 3, 4, 5:
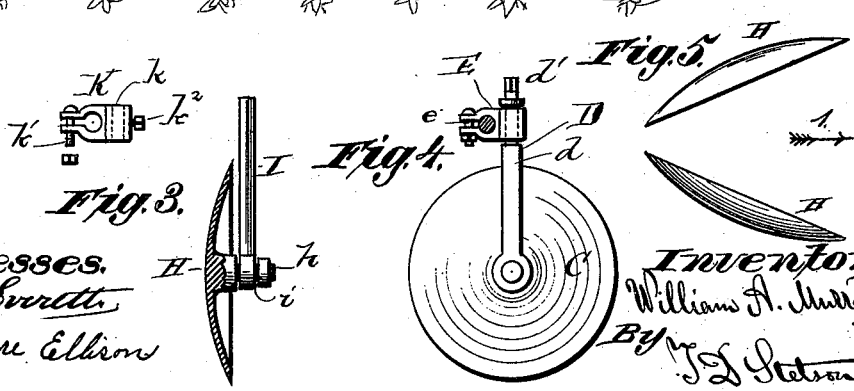

In the accompanying drawings, which form a part of this specification, Figure 1 is a side elevation; Fig. 2, a top plan view with the seat removed. Fig. 3 is a detail—a section of one of the revolving concavo-convex disks and its supports. Fig. 4 is a detail view of one of the guiding-disks and its connections. Fig. 5 is a diagram showing the position of the concavo-convex disks with relation to the line of travel when the disks are used to hill up the rows or plants.

Referring to the drawings, A designates the main frame of the cultivator, comprising a central bar, $a$, to which the draft is attached at $a'$, two side bars, $a^2$, and three cross-bars, $a^3$ $a^4$ $a^5$, as shown.

B designates a spring-seat.

The parts thus far described are of ordinary and approved construction.

C designates two guiding-disks having sharp edges $c$, and each journaled in the fork $d$ of a vertical shaft, D, having a rectangular head, $d'$. A portion of each shaft D, between a collar and shoulder, is journaled loosely in a clip, E, one of which is secured by bolt $e$ to the forward cross-bar, $a^5$, of the main frame near each forward corner. Upon the head $d'$ of one of the shafts D is engaged a hand-lever, F, which extends back so as to be conveniently manipulated from the driver's seat, and a link, $f$, connects this hand-lever F with a short lever, F', engaged similarly with the other shaft D. By moving the hand-lever F in either direction both of the guiding-disks are correspondingly and simultaneously deflected.

G designates double-shovel plows secured upon the cross-bar $a^4$ by adjustable clips $g$, and having braces $g'$, which connect a low point on each with the front cross-bar, $a^5$.

H designates each of two concave disks having a short axle, $h$, projecting from the concave side. This axle $h$ in each disk is journaled in a bearing, $i$, formed in a vertical arm, I, and is held therein by a nut or collar, $h'$. The arm I may be square for a portion of its length, and this square portion may fit snugly in a vertical socket or bearing, $k$, formed in a clip, K, which, by a bolt, K', is secured to the rear cross-bar, $a^3$, and may be adjusted thereon, being held in any desired position laterally by a screw and nut, $k'$. I show a set-screw, $K^2$, for holding the vertical arm I at any desired height. A sleeve, M, embraces the arm I at a lower point, and a brace, M', connects this sleeve with the forward cross-bar $a^5$. A set-screw, $m$, connects the sleeve M adjustably with the arm I.

In ordinary cultivation the machine is used as shown in Fig. 2, in which plows G mellow up the soil between the rows of plants 1 2 3, and the disks H pass one upon each side of the central row, 2, to cut away the weeds, grass, &c., close to the row, and throw the dirt and weeds away from the row. It is desirable to have these disks cut very close to the plants. As one disk operates upon either side, it will be seen that a nice adjustment of direction is necessary, as a slight deflection would destroy the plants. I obtain this nice adjustment by the sharp guiding-disks C, which enter the soil, and which may be controlled within narrow limits by the lever F. In traversing the field in one direction not only is the soil mellow-plowed between the rows, but the central row is weeded.

In some cases, for hilling the plants, the disks H may be set as shown in Fig. 5, the arrow indicating the direction of travel. The disks may be set as shown in Fig. 2 to cut away the weeds from a row, and as shown in Fig. 5 to hill up the same row in a subsequent or return traverse.

The plows G may be adjusted on the bar $a^4$ to suit rows of different widths apart.

Rows planted in drills may be thinned into hills by running my device transversely of the rows.

The plows G perform useful functions, not only in stirring the earth and destroying weeds in the intervals between the rows, but also by steadying the implement. The plows in their progress through the earth exert the tendency, well understood to belong to such devices, to hold the implement down, and also to prevent it from going too deep. This function is important in connection with the disks, which, in their important duties of cutting close to the row of plants and removing the earth from or hilling it toward the same, should act always at a tolerably uniform level. Their functions as bearing-wheels, to carry the weight of the implement and the driver, are materially aided by the plows. The rows of plants may be irregular or curved, and the operator may still, by sufficiently sharp attention and active shifting of the lever, cut close to the plants at all points without destroying any.

Modifications may be made in the forms and proportions without departing from the principle or sacrificing the advantages of the invention. Parts of the apparatus may be used without the whole. I can dispense with the double-shovel plows and employ other means, as ordinary bearing-wheels, to steady the implement, or I can operate with some success without any provision for steadying. I prefer the whole used together, as shown.

What I claim as new is—

1. In a cultivator, the combination, with two concavo-convex revolving disks, H H, arranged to operate upon opposite sides of a row of plants, of a sharp guiding-disk, as C, and means for controlling it and partially turning it at will, as set forth.

2. In a cultivator as described, the combination, with the frame A and adjustable disks H, of the two sharp-edged disks C, the hand-lever F, and the link $f$ and lever F', as set forth.

3. In a cultivator, as described, the frame A and double-shovel plows G, in combination with the shafts D, having forks $d$, and disks C, having sharp peripheries $c$ journaled in said forks, the clips E, long lever F, short lever F', and connecting-link $f$, as and for the purposes set forth.

4. The combination, with the plows G and disks C, of the concavo-convex disks H, arms I, and clips K, adjustably secured to the main frame A, and of the set-screws $K^2$, for holding the arms I in desired vertical adjustment, and the braces M', sleeves M, and set-screws $m$, as set forth.

In testimony whereof I have hereunto set my hand, at Auckland, New Zealand, this 1st day of August, 1885, in the presence of two subscribing witnesses.

WM. ARCHD. MURRAY.

Witnesses:
　GEORGE FRASER,
　FRANK H. WILLIAMS.